US008584276B1

(12) United States Patent
Wilson

(10) Patent No.: US 8,584,276 B1
(45) Date of Patent: Nov. 19, 2013

(54) COLLAPSIBLE MOTORCYCLE HAMMOCK

(75) Inventor: Mark C. Wilson, Albright, WV (US)

(73) Assignee: Wiskybilt, LLC, Albright, WV (US)

( * ) Notice: Subject to any disclaimer, the term of this patent is extended or adjusted under 35 U.S.C. 154(b) by 253 days.

(21) Appl. No.: 13/159,169

(22) Filed: Jun. 13, 2011

Related U.S. Application Data

(60) Provisional application No. 61/358,631, filed on Jun. 25, 2010.

(51) Int. Cl.
*A47C 17/64* (2006.01)

(52) U.S. Cl.
USPC .............................. 5/119; 5/118; 5/120; 5/127

(58) Field of Classification Search
USPC .................... 5/118–122, 127, 129; 108/44
See application file for complete search history.

(56) References Cited

U.S. PATENT DOCUMENTS

| | | | | |
|---|---|---|---|---|
| 624,324 A | * | 5/1899 | George | ................................ 5/95 |
| 1,741,449 A | * | 12/1929 | Butcher | ............................ 5/119 |
| 2,524,499 A | | 10/1950 | Weir | |
| 5,857,230 A | * | 1/1999 | Dowdy | ............................. 5/118 |
| 6,418,577 B1 | | 7/2002 | Murphy | |

* cited by examiner

*Primary Examiner* — Nicholas Polito
(74) *Attorney, Agent, or Firm* — Dinsmore & Shohl LLP; Monika J Hussell, Esq.

(57) ABSTRACT

Hammocks attachable to motorcycles, kits for assembling hammocks on motorcycles, and methods of utilization. The hammock includes two support members attachable to one of a front portion and a rear portion of the motorcycle, a safety support member attachable to the front portion or the rear portion of the motorcycle, and a flexible structure for supporting a person. The flexible structure has opposing ends which are attachable to support members such that the flexible structure is suspended in between the support members. The kit includes a front mounting structure attachable to a front portion of the motorcycle, a rear mounting structure attachable to a rear portion of the motorcycle, two flexible structure support members attachable to the front mounting structure and the rear mounting structure, a safety support member attachable the front portion or the rear portion of the motorcycle, and a flexible structure for supporting a person.

16 Claims, 14 Drawing Sheets

COLLAPSIBLE MOTORCYCLE HAMMOCK

This application claims priority to U.S. Provisional Application Ser. No. 61/358,631, filed Jun. 25, 2010, the contents of which are hereby incorporated by reference in its entirety.

TECHNICAL FIELD

The present disclosure relates generally to hammocks, and particularly to hammocks releasably attachable to motorcycles, to kits for assembling hammocks on motorcycles, and to methods of utilization thereof.

BACKGROUND

During extended rides, motorcyclists often become uncomfortable. Thus, motorcyclists commonly take breaks from riding to rest. To maximize comfort, it is desirable to rest in positions alternative to sitting on the seat of the motorcycle. While it is particularly desirable for motorcyclists to rest in a horizontal position, the narrow shape of motorcycle seats limits the ability of motorcyclists to rest horizontally on the motorcycles. Thus, motorcyclists must often rely on external support surfaces to rest horizontally. For example, motorcyclists must often rely upon the ground, benches, and/or tables to rest. These options are not ideal, however, in that these support surfaces may be uncomfortable and/or unavailable.

Various hammocks have been developed which are configured for transport and which may be utilized in a variety of locations. However, the designs of such hammocks are not ideal. For example, while U.S. Pat. No. 5,857,230 mentions a combination motorcycle hammock and jack which may be secured to motorcycle cargo racks and to motorcycle handlebars, such hammocks are problematic in that they may be both uncomfortable and unstable. Thus, additional embodiments are desired.

SUMMARY

According to one embodiment, a hammock releasably attachable to a motorcycle is disclosed. The hammock includes a pair of flexible structure support members, at least one safety support member attachable to one of the front portion and the rear portion of the motorcycle, and a flexible structure for supporting a person. Each of the pair of flexible structure support members is attachable to one of a front portion and a rear portion of the motorcycle. The flexible structure has opposing ends, wherein the opposing ends are attachable to each of the pair of flexible structure support members. When the hammock is releasably attached to the motorcycle, each of the pair of flexible structure support members is releasably attached to one of the front portion and the rear portion of the motorcycle, the at least one safety support member is releasably attached to one of the front portion and the rear portion of the motorcycle, and the opposing ends are releasably attached to each of the pair of flexible structure support members such that the flexible structure is suspended substantially in between the pair of flexible structure support members.

In another embodiment, one of the pair of flexible structure support members is attachable to a front portion of the motorcycle with a front mounting structure, and the remaining flexible structure support member is attachable to a rear portion of the motorcycle with a rear mounting structure. When the flexible structure support members are attached thereto, each of the flexible structure support members extends substantially upward and outward from the front mounting structure and the rear mounting structure. The safety support member is attachable to one of the front portion and the rear portion of the motorcycle with a front mounting structure, a rear mounting structure, or a safety support mounting structure. When the safety support member is attached thereto, the safety support member contacts a support surface. When the opposing ends are attached to the flexible structure support members, the flexible structure is suspended substantially in between the flexible structure support members such that the person is supported without contacting the support surface.

In yet another embodiment, a kit for assembling a hammock on a motorcycle is disclosed. The kit includes a front mounting structure attachable to a front portion of the motorcycle, a rear mounting structure attachable to a rear portion of the motorcycle, a pair of flexible structure support members attachable to one of the front mounting structure and the rear mounting structure, at least one safety support member attachable to one of the front portion and the rear portion of the motorcycle, and a flexible structure for supporting a person, the flexible structure comprising opposing ends, wherein the opposing ends are attachable to each of the pair of flexible structure support members. When the hammock is assembled on the motorcycle, the front mounting structure is attached to the front portion of the motorcycle, the rear mounting structure is attached to the rear portion of the motorcycle, each of the pair of flexible structure support members is releasably attached to the front mounting structure and the rear mounting structure, the at least one safety support member is releasably attached to the front mounting structure or the rear mounting structure of the motorcycle, and the opposing ends are releasably attached to each of the pair of flexible structure support members such that the flexible structure is suspended substantially in between the pair of flexible structure support members.

These and other features and advantages of these and other various embodiments according to the present disclosure will become more apparent in view of the drawings, detailed description, and claims provided that follow hereafter.

BRIEF DESCRIPTION OF THE DRAWINGS

The following detailed description of the embodiments of the present disclosure can be best understood when read in conjunction with the following drawings, where like structure is indicated with like reference numerals, and in which.

Skilled artisans appreciate that elements in the figures are illustrated for simplicity and clarity and have not necessarily been drawn to scale. For example, the dimensions of some of the elements in the figures may be exaggerated relative to other elements, as well as conventional parts removed, to help to improve understanding of the various embodiments of the present disclosure.

DETAILED DESCRIPTION

The following terms are used in the present application:

As used herein, the term "releasably attached" refers to the ability of attached structures and/or members to be detached without loss or damage to the structures and/or members. For example, in the context of a hammock releasably attached to a motorcycle, a flexible structure support member may be releasably attached to a front portion of a motorcycle such that the flexible structure support member can be detached from the front portion of the motorcycle without loss or damage.

As used herein, the terms "assembly", "assemble", and/or "assembling" refer to the attachment, joining, engagement, and/or fitting of structures and/or members. For example, in the context of a hammock, the hammock is assembled wherein only some or all of the structures and/or members are attached. When only some of the structures and/or members are attached, the assembly of the hammock is partial. When all of the structures and/or members are attached, the assembly of the hammock is complete.

As used herein, the terms "disassembly", "disassemble", and/or "disassembling" refer to the detachment, disjoining, and/or disengagement of structures and/or members. For example, in the context of a hammock, the hammock is disassembled wherein some or all of the structures and/or members are detached. When only some of the structures and/or members are detached, the disassembly of the hammock is partial. When all of the structures and/or members are detached, the disassembly of the hammock is complete.

Hammock

Figure 1:
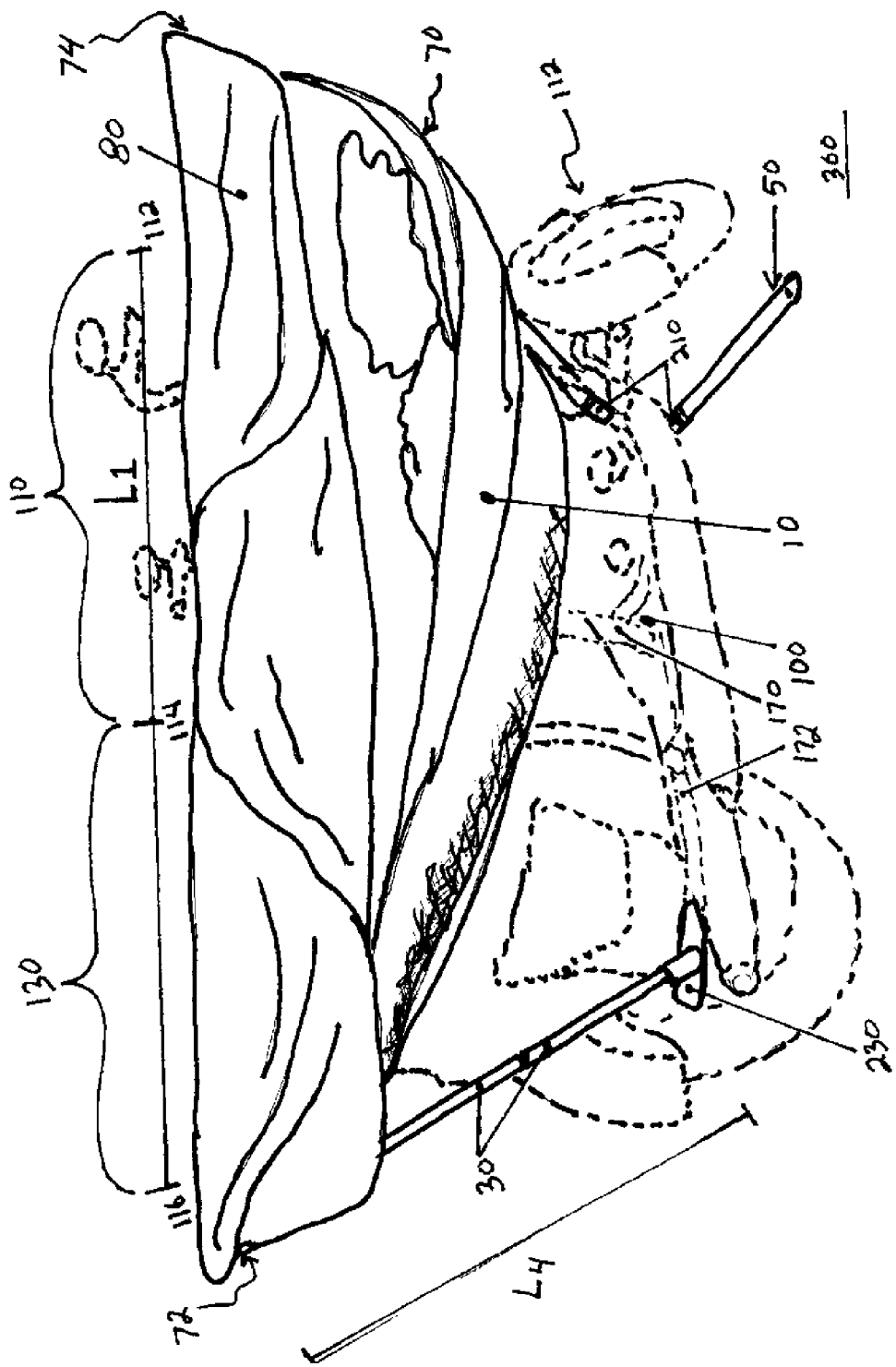
FIG. 1 is a front perspective view of a hammock releasably attached to a motorcycle according to an embodiment of the present disclosure.
Figure 12:
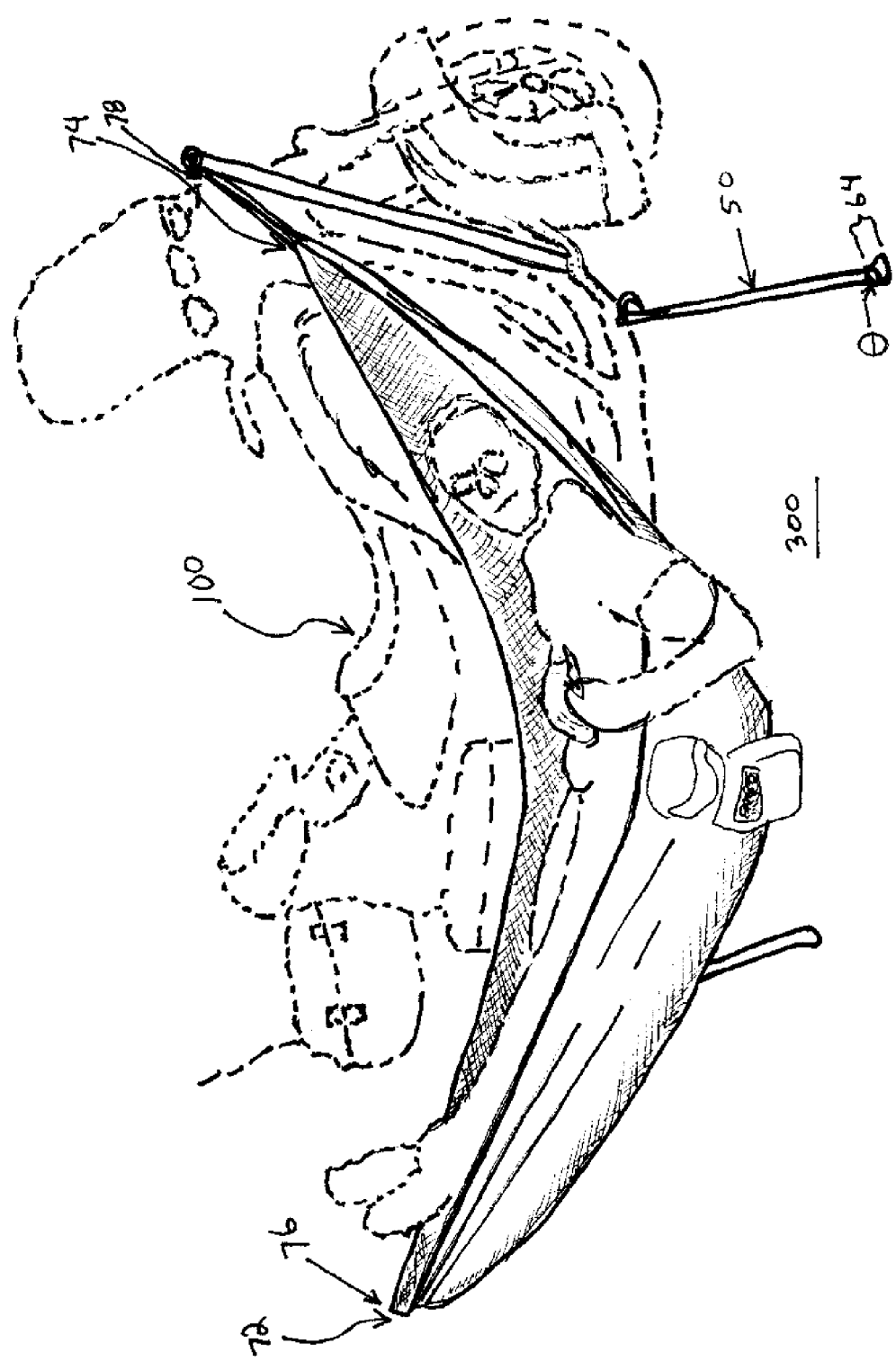
FIG. 12 is a front perspective view of a hammock releasably attached to a motorcycle wherein the hammock has two safety support members according to an embodiment of the present disclosure.

Embodiments of the present disclosure relate to hammocks releasably attachable to motorcycles, to kits for assembling hammocks on motorcycles, and to methods of utilization thereof. Referring to FIGS. 1 and 12, a hammock 10 releasably attachable to a motorcycle 100 is disclosed. In one embodiment, the hammock 10 is releasably attachable to the motorcycle 100 such that the hammock 10 may quickly be completely assembled and/or disassembled. Complete assembly and/or disassembly is quick in that it may be accomplished in less than about 5 minutes. In one specific example, complete assembly and/or disassembly is quick in that it may be accomplished in less than about 3 minutes. More specifically, the hammock 10 may be completely assembled and/or disassembled in the range of about 1 to about 5 minutes, or about 1 to about 3 minutes, or about 2 to about 3 minutes. In some instances, the complete disassembly process may be accomplished more quickly than the complete assembly process. In other instances, the complete assembly process may be accomplished more quickly than the complete disassembly process. Alternatively, the complete assembly process may be accomplished in substantially the same amount of time as the complete disassembly process.

Figure 2:
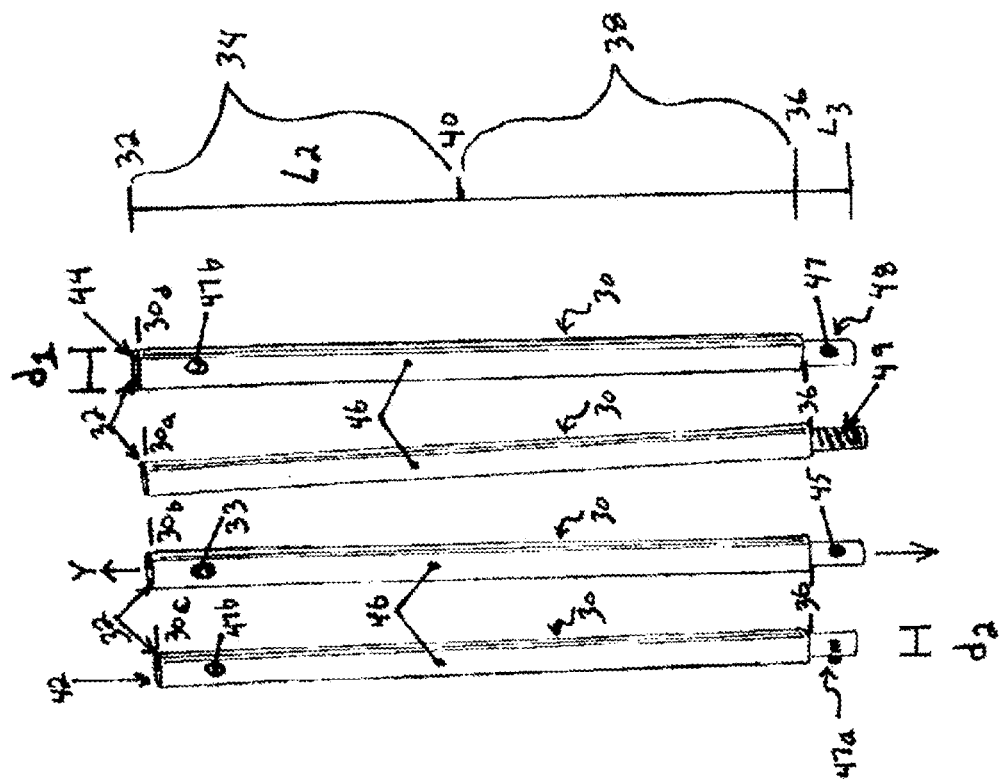
FIG. 2 is a front perspective view of a plurality of flexible structure support members according to an embodiment of the present disclosure.

Referring to FIGS. 1 and 2, the hammock 10 includes a pair of flexible structure support members 30, at least one safety support member 50, and a flexible structure 70 for supporting a person. In one embodiment, the pair of flexible structure support members 30 are attachable to a front portion 110 and a rear portion 130 of the motorcycle 100. The front portion 110 of the motorcycle 100 extends from the front-most point 112 of the motorcycle 100 to the approximate midpoint 114 of the length $L_1$ of the motorcycle 100 (wherein the length $L_1$ extends from the front-most point 112 of the motorcycle 100 to the rear-most point 116 of the motorcycle 100). Similarly, the rear portion 130 of the motorcycle 100 extends from the rear-most point 116 of the motorcycle 100 to the approximate midpoint 114 of the length $L_1$ of the motorcycle.

In one particular embodiment, the flexible structure support members 30 may have a substantially elongate shape. In another embodiment, the flexible structure support members 30 may have a cross-sectional shape selected from the group consisting of substantially circular, oblong, elliptical, triangular, square, and rectangular. In a further embodiment, the flexible structure support members 30 may have a substantially elongate shape with a substantially circular cross-section. In yet a further embodiment, the flexible structure support members 30 may have a substantially rod-like shape with a substantially circular cross-section. The flexible structure support members 30 may be hollow, solid, or substantially solid, and combinations thereof. In one embodiment, the flexible structure support members 30 are composed of a material selected from the group consisting of metals, composites, and combinations thereof.

The flexible structure support members 30 have an upper surface 32, an upper portion 34, a lower surface 36, a lower portion 38, and circumferential surfaces 46. The upper portion 34 extends from the upper surface 32 to the approximate midpoint 40 of the length $L_2$ of the flexible structure support members 30 (wherein the length $L_2$ extends from the upper surface 32 to the lower surface 36). The lower portion 38 extends from the lower surface 36 to the midpoint 40. The circumferential surfaces 46 extend from the upper surface 32 to the lower surface 36.

The upper portion 34 is attachable to the flexible structure 70. More particularly, the upper portion 34 may provide attachment surfaces, areas, points, and/or apertures wherein suitable attachment devices (discussed below) may be attached thereto. For example, in one embodiment, the upper portion 32 of each of the flexible structure support members 30 may define an attachment device receiving aperture 42 for receiving attachment devices (discussed in a later section) of the flexible structure 70 such that the flexible structure 70 may be secured thereto. The attachment device receiving aperture 42 may have a substantially circular, oblong, elliptical, triangular, square, or rectangular shape. In one particular embodiment, the attachment device receiving aperture 42 may have a substantially circular shape. The shape of the attachment device receiving aperture 42 should not be limited to those disclosed herein, however, but may have any shape capable of receiving the attachment devices (discussed in a later section) of the flexible structure 70 securing the flexible structure 70 thereto.

One or more attachment device receiving apertures 42 may be positioned within the upper surface 32 of each of the flexible structure support members 30. In one particular embodiment, one attachment device receiving aperture 42 may be positioned within each of the upper surface 32 of the flexible structure support members 30. In this embodiment, the attachment device receiving aperture 42 may have a substantially circular shape which is substantially concentric with the cross-sectional shape of the flexible structure support member 30. Alternatively, the attachment device receiving aperture 42 may be positioned within any portion of the circumferential surfaces 46 of the upper portion 34 such that when the hammock 10 is completely assembled on the motorcycle 100, the flexible structure 70 is suspended in between the pair of flexible structure support members 30.

Alternatively, in another embodiment, the upper portion 34 of each of the flexible structure support members 30 may have an attachment ring (not shown) or hook (not shown) for receiving attachment devices (discussed in a later section) such that the flexible structure 70 may be secured thereto. The attachment ring or hook may be integral with or attached to the upper surface 32. Additionally, the attachment ring or hook may extend outwardly from the upper surface 32 in a direction substantially normal to the upper surface 32.

Figure 13A:
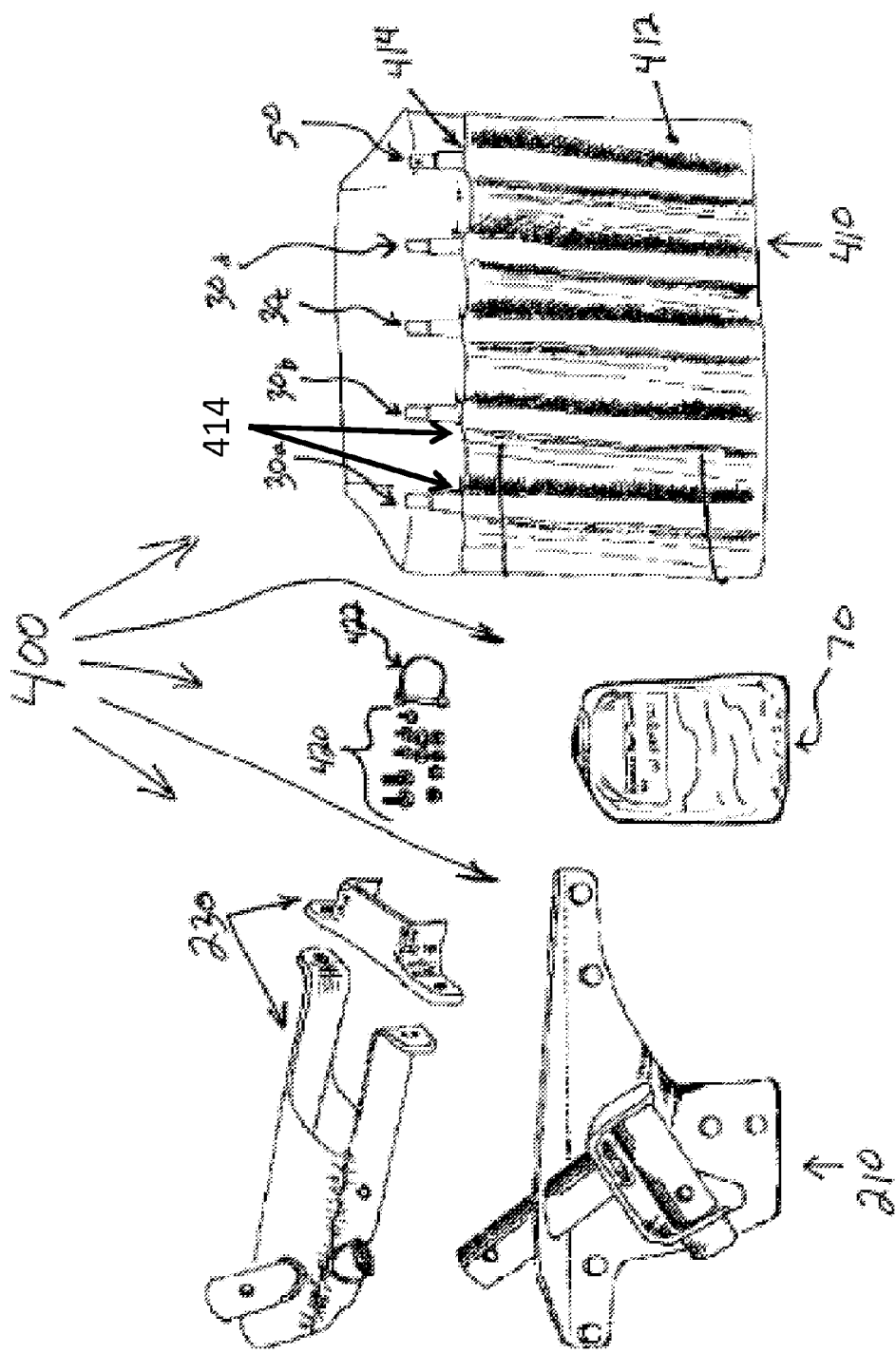
FIG. 13A is a front perspective view of a kit for assembling a hammock on a motorcycle in the operative configuration according to an embodiment of the present disclosure.

The lower portion 38 is attachable to the front portion 110 and the rear portion 130 of the motorcycle 100. In one embodiment, each of the flexible structure support members 30 include an attachment portion 48 integral with or attached to the lower portion 38. In one embodiment, the attachment portion 48 has a substantially elongate shape. In another embodiment, the attachment portion 48 may have a cross-sectional shape selected from the group consisting of substantially circular, oblong, elliptical, triangular, square, and rectangular. In one particular embodiment, the attachment portion 48 may have a substantially elongate shape with a substantially circular cross-section. In a further embodiment, the attachment portion 48 has a substantially rod-like shape with a substantially circular cross-section. The attachment portion 48 may extend outwardly from the lower surface 36 in a direction substantially parallel to the center axis Y of the flexible structure support members 30 (as indicated by double arrow Y). The attachment portion 48 of each of the flexible structure support members 30 may be releasably attached to the front portion 110 or the rear portion 130 of the motorcycle 100 (as discussed in a later section). The flexible structure support members 30 may be releasably attached to the front portion 110 or the rear portion 130 of the motorcycle 100 via a sliding fit, a clip, a pin 422 (as shown in FIG. 13A), a spring bias catch 47, or threads 49.

In one embodiment wherein the flexible structure support members 30 are releasably attached to the motorcycle 100 with a pin 422, the attachment portion 48 may include an aperture 45 through which the pin 422 may be inserted. In another embodiment wherein the flexible structure support members 30 are releasably attached to the motorcycle 100 with a spring bias catch 47, the attachment portion 48 may include a spring bias catch 47. In yet another embodiment wherein the flexible structure support members 30 are releasably attached to the motorcycle 100 with threads 49, the attachment portion 48 may include threads 49.

The overall length $L_2$ of the flexible structure support members 30 may be from about 1 to about 5 feet, or alternatively from about 2 to about 3 feet, or alternatively about 2.5 feet. The diameter $d_1$ of the flexible structure support members 30 may be from about 0.5 to about 6 inches, or alternatively from about 1 to about 3 inches, or alternatively about 1 inch. The dimensions of the flexible structure support members 30 should not be limited to those disclosed herein, however, but may include any dimensions such that the flexible structure support members 30 are attachable to the front portion 110 and the rear portion 130 of the motorcycle 100.

The overall length $L_3$ of the attachment portion 48 may be from about 0.5 to about 6 inches, or alternatively from about 1 to about 3 inches, or about 2 inches. The diameter $d_2$ of the attachment portion 48 may be from about 0.5 inches to about 3 inches, or alternatively from about 1 inches to about 2 inches, or about 1.25 inches. In one particular embodiment, the diameter $d_2$ of the attachment portion 48 is less than that of the diameter $d_1$ of the flexible structure support members 30. The dimensions of the attachment portion 48 should not be limited to those disclosed herein, however, but may include any dimensions such that the flexible structure support members 30 are attachable to the front portion 110 and the rear portion 130 of the motorcycle 100.

In one embodiment, a plurality of the flexible structure support members 30a, 30b may be attached to form one flexible structure support member 30 of extended length $L_4$ (as shown in FIG. 1). In one particular embodiment, two pairs of the flexible structure support members 30a, 30b, and 30c, 30d, may be attached to form two flexible structure support members 30 of extended length. By employing a plurality of attached members 30a, 30b, and 30c, 30d, the assembled flexible structure support members 30 (composed of a plurality of attached members 30a, 30b, and 30c, 30d) may have a length $L_4$ which is greater than the length $L_2$ of the individual flexible structure support members 30a, 30b, 30c, 30d. In this way, the attached members 30a, 30b and 30c, 30d, of shorter lengths $L_2$ are compact and may be easily transported (such as during extended motorcycle rides).

Each of the attached members 30a, 30b, 30c, 30d, are as described above and include an attachment portion 48. In one embodiment wherein the attached members 30a, 30b, 30c, 30d are releasably attached via a sliding fit, the attached members 30a, 30b, 30c, 30d include an aperture 44 positioned within the upper surface 32 of each of the flexible structure support members 30 as discussed above. The aperture 44 may have a diameter which is greater than the diameter $d_2$ of the attachment portion 48, such that the attachment portion 48 may be inserted within the aperture 44. The members 30a, 30b may be releasably attached with a minimal amount of force. In this way, a flexible structure support member 30 may be manually assembled by a person without the need for tools.

In an alternative embodiment wherein the attachment portion 48 includes an aperture 45, the upper portion 34 of the flexible structure support members 30 may include an aperture 33 through which a pin 422 may be inserted. In another alternative embodiment wherein the attachment portion 48 includes a spring bias catch 47, the spring bias catch 47 includes a spring (not shown) operably attached to an engaging member 47a. When the engaging member 47a is engaged, the engaging member 47a retracts into the attachment portion 48, causing the spring to compress. When the engaging member 47a is disengaged, the spring decompresses causing the engaging member 47a to extend to its original position. Thus, the spring bias catch 47 may secure the attachment of one member 30c to another member 30d when the upper portion 34 of the flexible structure support members 30 defines a catch 47b through which the engaging member 47a may extend. However, it is understood by one skilled in the art that the attachment of the members 30c, 30d should not be limited to a spring bias catch 47, but may include any suitable locking mechanism which secures the attachment of the members 30c, 30d.

In yet another alternative embodiment wherein the attachment portion 48 includes threads 49, the attached members 30a, 30b include an aperture 44 positioned within the upper surface 32 of each of the flexible structure support members 30 as discussed above. The aperture 44 may have a diameter which is greater than the diameter $d_2$ of the attachment portion 48, such that the attachment portion 48 may be inserted within the aperture 44. The aperture 44 may also include threads such that the attachment portion 48 of one member 30a may be attached to a second member 30b by threading the attachment portion 48 into the aperture 44 and rotating the member 30a via relative motion. The members 30a, 30b may be releasably attached with a minimal amount of force. In this way, a flexible structure support member 30 may be manually assembled by a person with or without the need for tools.

The length $L_4$ of the assembled flexible structure support member 30 which includes a plurality of attached members 30a, 30b is from about 1 to about 10 feet, or from about 2 to about 8 feet, or about 4 feet. The dimensions of the length $L_4$ of the assembled flexible structure support member 30 should not be limited to those disclosed herein, however, but may include any dimensions wherein the flexible structure support members 30 may be releasably attached to a flexible structure 70 for supporting a person which is suspended substantially in between the pair of flexible structure support members when attached thereto.

The pair of flexible structure support members 30 may be releasably attached to the motorcycle 100. More particularly, one of the pair of flexible structure support members 30 may be releasably attached to the front portion 110 of the motorcycle 100 and the remaining flexible structure support member 30 may be releasably attached to the rear portion 130 of the motorcycle 100. One of the flexible structure support members 30 may be releasably attached to the front portion 110 of the motorcycle 100 with a mounting structure 210. The remaining flexible structure support member 30 may be releasably attached to the rear portion 130 of the motorcycle 100 with a rear mounting structure 230.

In an alternative embodiment, the pair of flexible structure support members 30 may be fixedly attached to the front portion 110 of the motorcycle 100 and the rear portion of 130 of the motorcycle 100. More particularly, in this embodiment, the flexible structure support members 30 may be fixedly attached to the front and rear portions 110, 130 of the motorcycle 100 such that they are not removed during travel and/or extended rides. In this particular embodiment, the flexible structure support members 30 may be transported by employing folding mechanisms such that each of the flexible structure support members 30 may be compactly stored during travel and/or extended rides. One example of such a folding mechanism includes a hinging mechanism. Alternatively, the flexible structure support members 30 may employ a slidable fit mechanism wherein one of the attached members 30a, 30b, 30c, 30d may be nested substantially within another of the attached members 30a, 30b, 30c, 30d, such that each of the flexible structure support members 30 may be compactly stored during travel and/or extended rides.

Figure 3:
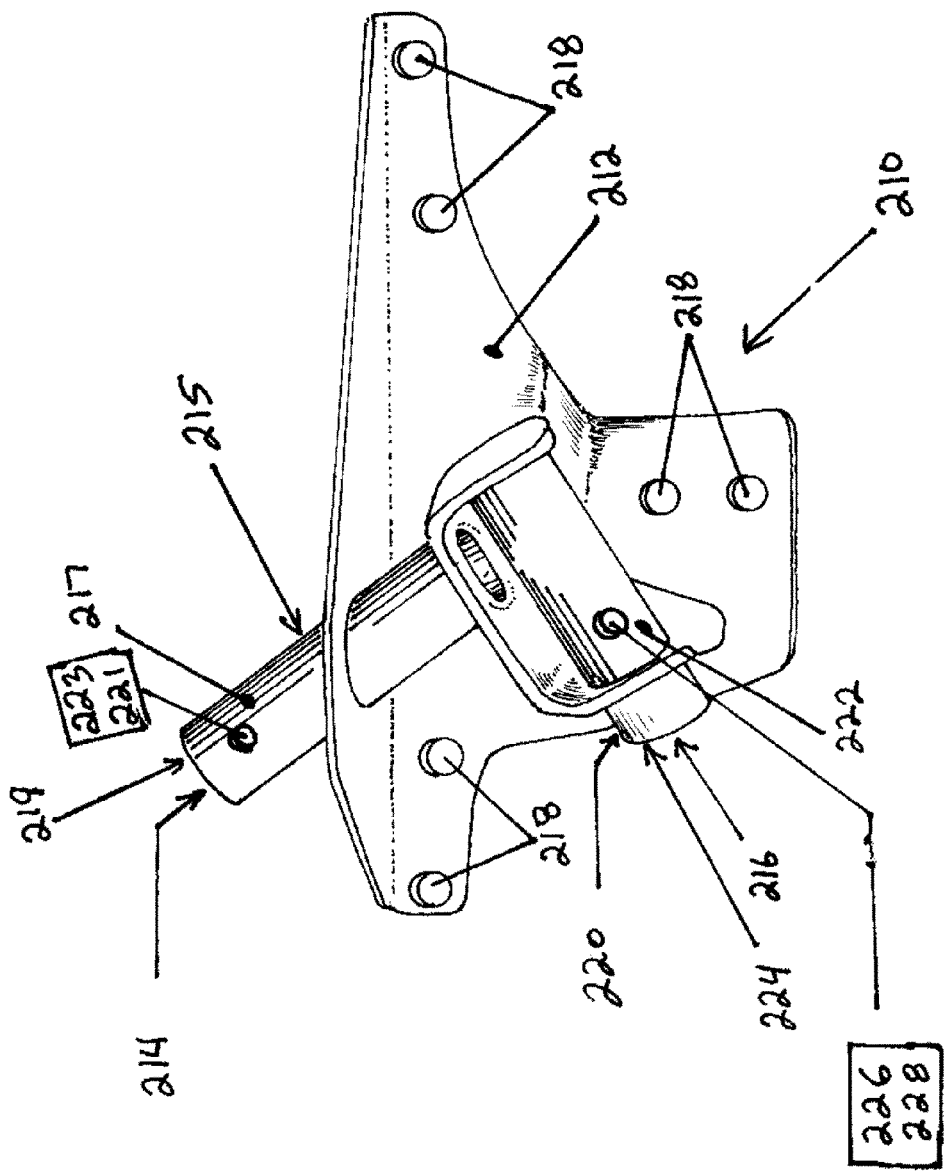
FIG. 3 is a front perspective view of a front mounting structure according to an embodiment of the present disclosure.
Figure 4:
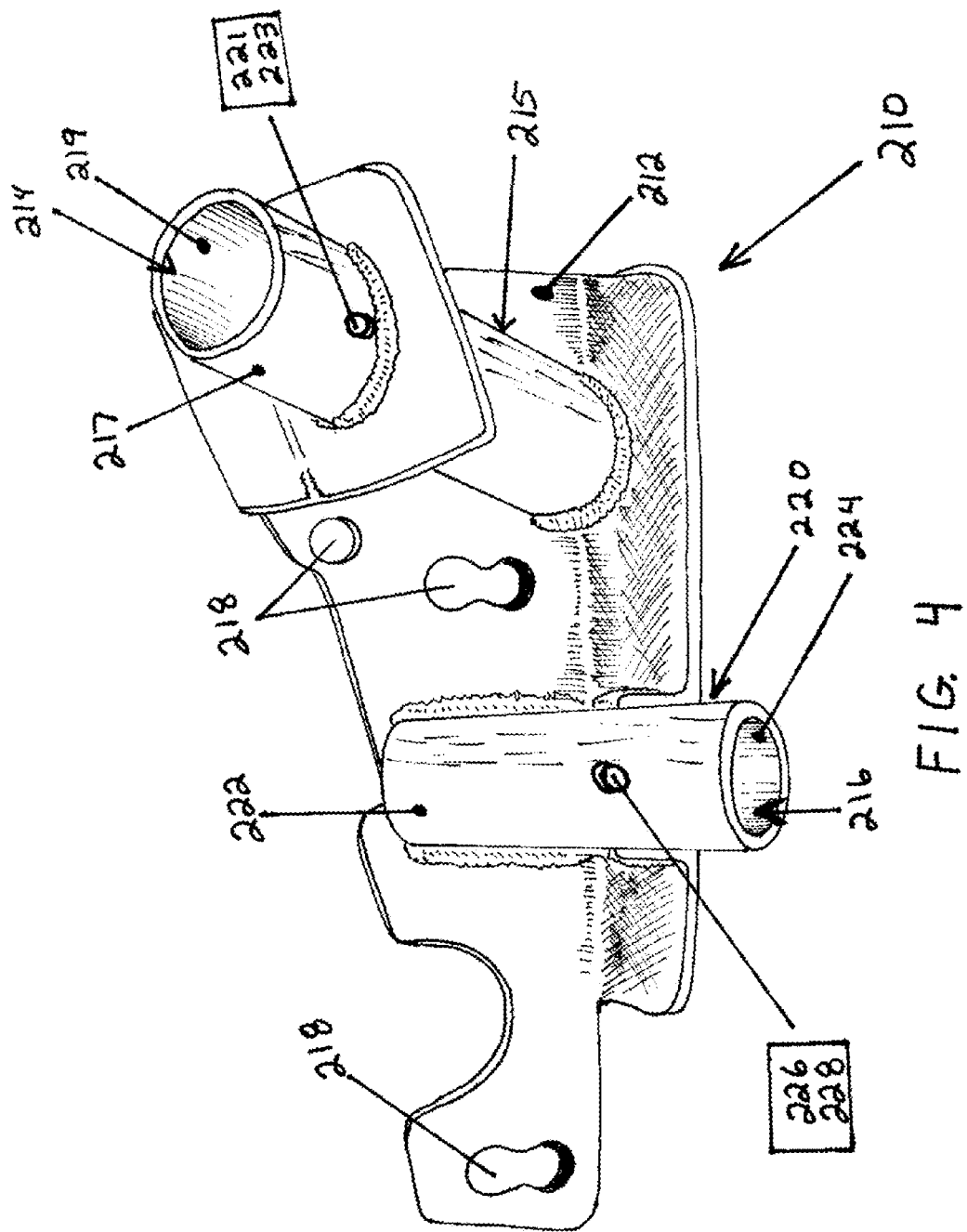
FIG. 4 is a front perspective view of a front mounting structure according to another embodiment of the present disclosure.
Figure 5:
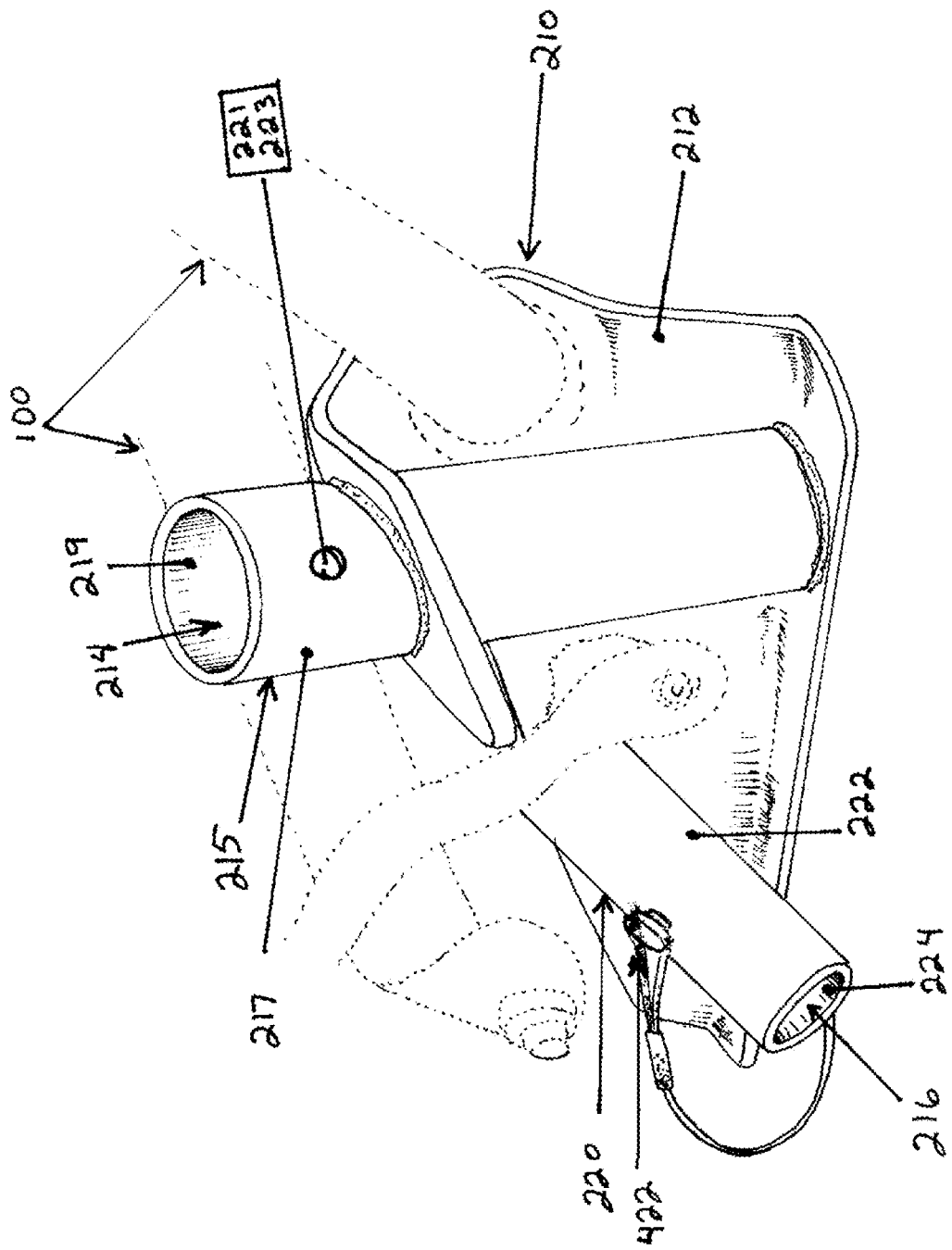
FIG. 5 is a side perspective view of front mounting structure attached to a motorcycle according to an embodiment of the present disclosure.

Referring to FIGS. 3-5, the front mounting structure 210 includes a motorcycle engaging plate 212 and defines a flexible structure support member receiving aperture 214 and a safety support member receiving aperture 216. The motorcycle engaging plate 212, flexible structure support member receiving aperture 214, and safety support member receiving aperture 216 may be integral or attached. The front mounting structure 210 is composed of a material selected from the group consisting of metals, composites, and combinations thereof.

In one embodiment, the motorcycle engaging plate 212 may be substantially L-shaped. However, the motorcycle engaging plate 212 may be shaped to accommodate the motorcycle 100 to which it will be attached. More particularly, the shape of the motorcycle engaging plate 212 may change as a function of the make and model of the motorcycle 100 to which it will be attached. For example, in FIG. 3, the front mounting structure 210 is customized for attachment to a Harley Davidson Dyna®. As another example, in FIG. 4, the front mounting structure 210 is customized for attachment to an FLH Harley Davidson® Touring Bike. However, it is understood by one of ordinary skill in the art that the shape of the motorcycle engaging plate 212 may be adapted to accommodate the front portion 110 of the motorcycle 100 to which it will be attached.

In one embodiment, the motorcycle engaging plate 212 may function as a bracket. In a further embodiment, the motorcycle engaging plate 212 may define a plurality of apertures 218 for receiving attachment devices (discussed below) for securing the motorcycle engaging plate 212 to the motorcycle 100. The motorcycle engaging plate 212 is attachable to the front portion 110 of the motorcycle 100. More particularly, the motorcycle engaging plate 212 is attachable to a solid mounting surface including but not limited to the frame 170 of motorcycle 100.

The front mounting structure 210 also defines a flexible structure support member receiving aperture 214. The flexible structure support member receiving aperture 214 is defined by a tubular member 215. In one embodiment, the tubular member 215 may have a substantially elongate shape. In another embodiment, the tubular member 215 may have a cross-sectional shape selected from the group consisting of substantially circular, oblong, elliptical, triangular, square, and rectangular. In a further embodiment, the tubular member 215 may have a substantially elongate shape with a substantially circular cross-section. In a further embodiment, the tubular member 215 may have a substantially rod-like shape with a substantially circular cross-section. The tubular member 215 may be hollow, solid, or substantially solid, and combinations thereof.

The tubular member 215 has an outer surface 217 and an inner surface 219. The tubular member 215 extends outwardly from the motorcycle engaging plate 212. As previously discussed, a flexible structure support member 30 may be releasably attached to the front mounting structure 210 through the flexible structure support member receiving aperture 214.

In one embodiment wherein the attached members 30a, 30b, 30c, 30d are releasably attached via a sliding fit, attached members 30a, 30b, 30c, 30d include an attachment portion 48 as discussed above. In this particular embodiment, the flexible structure support member receiving aperture 214 may have a diameter which is greater than the diameter $d_2$ of the attachment portion 48 of the flexible structure support members 30. In this way, the attachment portion 48 may be inserted within the flexible structure support member receiving aperture 214 via the steps previously discussed with regard to attaching a plurality of attachment members 30a, 30b, 30c, 30d.

In an alternative embodiment wherein the flexible structure support members 30 are releasably attached to the motorcycle 100 with a pin 422, the tubular member 215 may include an aperture 223 through which the pin 422 may be inserted. In this way, the flexible structure support members 30 may be inserted within the flexible structure support member receiving aperture 214 and a pin 422 may be inserted through the apertures 45, 223, securing the flexible structure support members to the front mounting structure 210. In another alternative embodiment wherein the flexible structure support members 30 include a spring bias catch 47, the tubular member 215 may define a catch 221 through which an engaging member 47a of a flexible structure support member 30 may extend, securing the attachment of the flexible structure support member 30 to the front mounting structure 210. This may be accomplished via the steps previously discussed with regard to attaching a plurality of attachment members 30c, 30d.

In another alternative embodiment wherein the flexible structure support member 30 includes threads 49, the inner surface 219 of the tubular member 215 may include threads (not shown). In this particular embodiment, the flexible structure support member receiving aperture 214 may have a diameter which is greater than the diameter $d_2$ of the attachment portion 48 of the flexible structure support members 30. In this way, the attachment portion 48 may be inserted within the flexible structure support member receiving aperture 214. The flexible structure support member 30 may be releasably attached to the front mounting structure 210 by threading the attachment portion 48 into the aperture 214. This may be accomplished via the steps previously discussed with regard to attaching a plurality of attachment members 30a, 30b.

The front mounting structure 210 also defines a safety support member receiving aperture 216. The safety support member receiving aperture 216 is defined by a tubular member 220. In one embodiment, the tubular member 220 may have a substantially elongate shape. In another embodiment, the tubular member 215 may have a cross-sectional shape selected from the group consisting of circular, oblong, elliptical, triangular, square, and rectangular. In a further embodiment, the tubular member 220 may have a substantially elongate shape with a substantially circular cross-section. In yet a further embodiment, the tubular member 220 may have a substantially rod-like shape with a substantially circular cross-section. The tubular member 220 may be hollow, solid, or substantially solid, and combinations thereof.

The tubular member 220 has an outer surface 222 and an inner surface 224. The tubular member 220 extends outwardly from the motorcycle engaging plate 212. A safety support member 50 (discussed below) may be releasably attached to the front mounting structure 210 through the safety support member receiving aperture 216. In one embodiment wherein the safety support member may be releasably attached to the front mounting structure 210 via a sliding fit, the safety support member receiving aperture 216 may have a diameter which is greater than the diameter of the attachment portion 63 of the safety support members 50. In this way, the attachment portion 63 may be inserted within the safety support member receiving aperture 216 via the steps previously discussed with regard to attaching a plurality of attachment members 30a, 30b, 30c, 30d.

In an alternative embodiment wherein the safety support members 50 are releasably attached to the motorcycle 100 with a pin 422, the tubular member 220 may include an aperture 228 through which the pin 422 may be inserted. In this way, the safety support members 50 may be inserted within the safety support member receiving aperture 216 and the pin 422 may be inserted through the apertures 57, 228, securing the safety support member 50 to the front mounting structure 210. In another alternative embodiment, the safety support member 50 may include a spring bias catch 65, and the tubular member 220 may define a catch 226 through which an engaging member 65a of a safety support member 50 may extend, securing the attachment of the safety support member 50 to the front mounting structure 210. This may be accomplished via the steps previously discussed with regard to attaching a plurality of attachment members 30c, 30d.

In yet alternative embodiment wherein the safety support member includes threads (not shown), the inner surface 224 of the tubular member 220 may include threads (not shown). In this particular embodiment, the safety support member receiving aperture 216 may have a diameter which is greater than the diameter of the attachment portion 63 of the safety support members 50. In this way, the attachment portion 63 may be inserted within the safety support member receiving aperture 216. The safety support member receiving aperture 216 may be releasably attached to the front mounting structure 210 by threading the attachment portion 63 into the aperture 216. This may be accomplished via the steps previously discussed with regard to attaching a plurality of attachment members 30a, 30b.

The tubular members 215, 220 may extend from the motorcycle 100 at any angle such that when the hammock 10 is completely assembled, the flexible structure 70 is suspended substantially in between the flexible structure support members 30 and the safety support members 50 contact the support surface 300.

Figure 6:
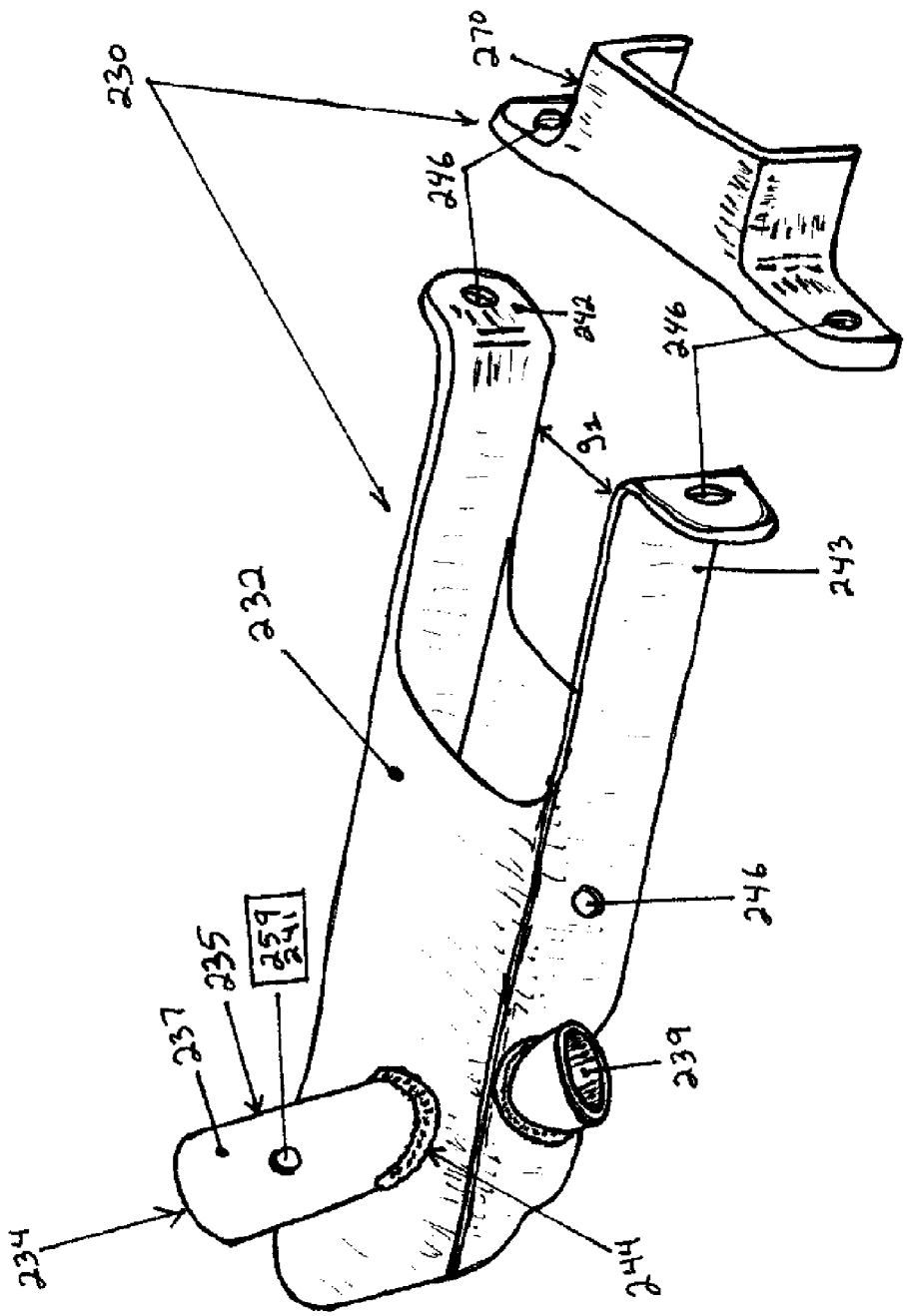
FIG. 6 is a front perspective view of a rear mounting structure according to an embodiment of the present disclosure.
Figure 7:
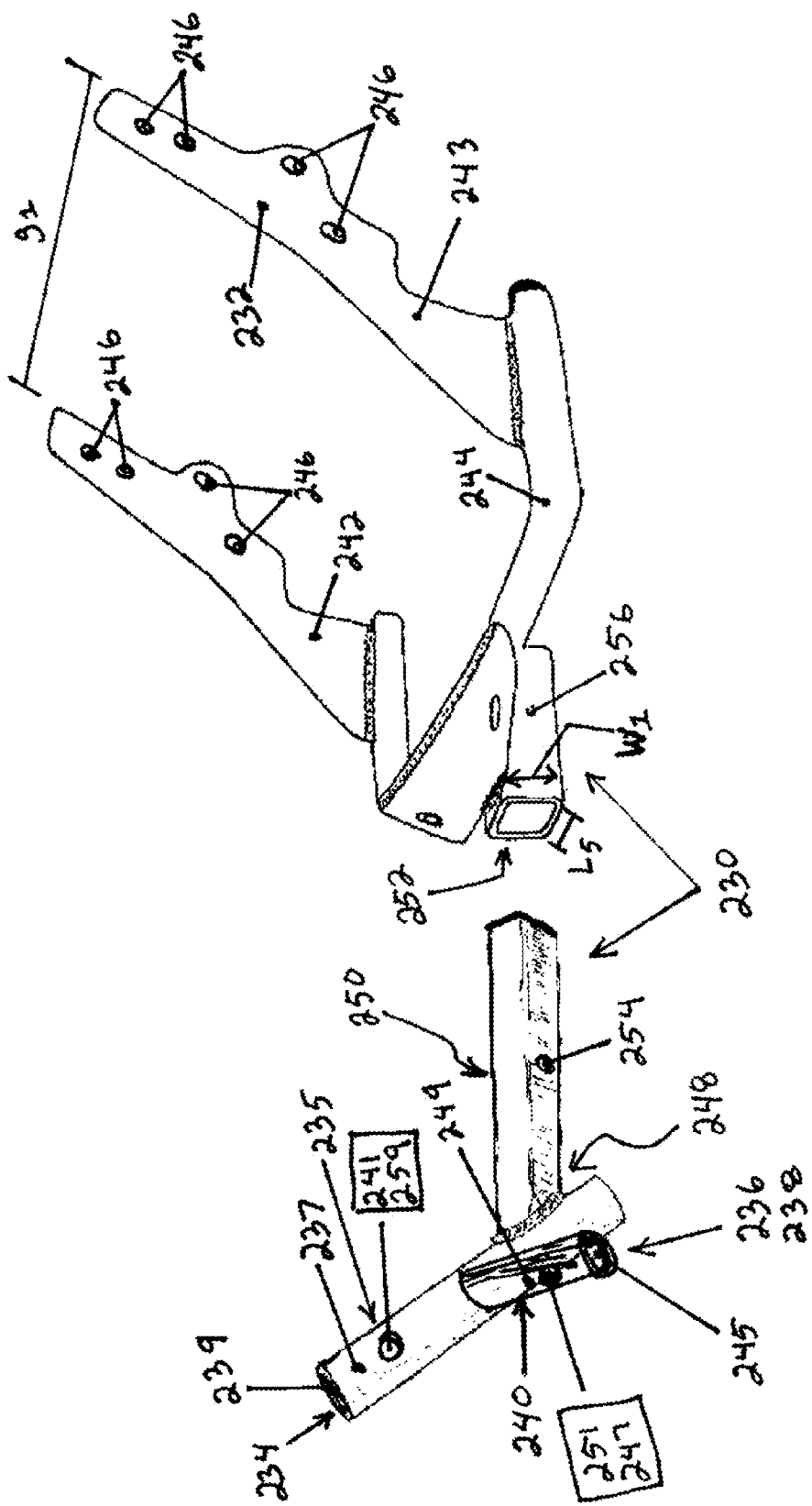
FIG. 7 is a front perspective view of a rear mounting structure according to another embodiment of the present disclosure.
Figure 8:
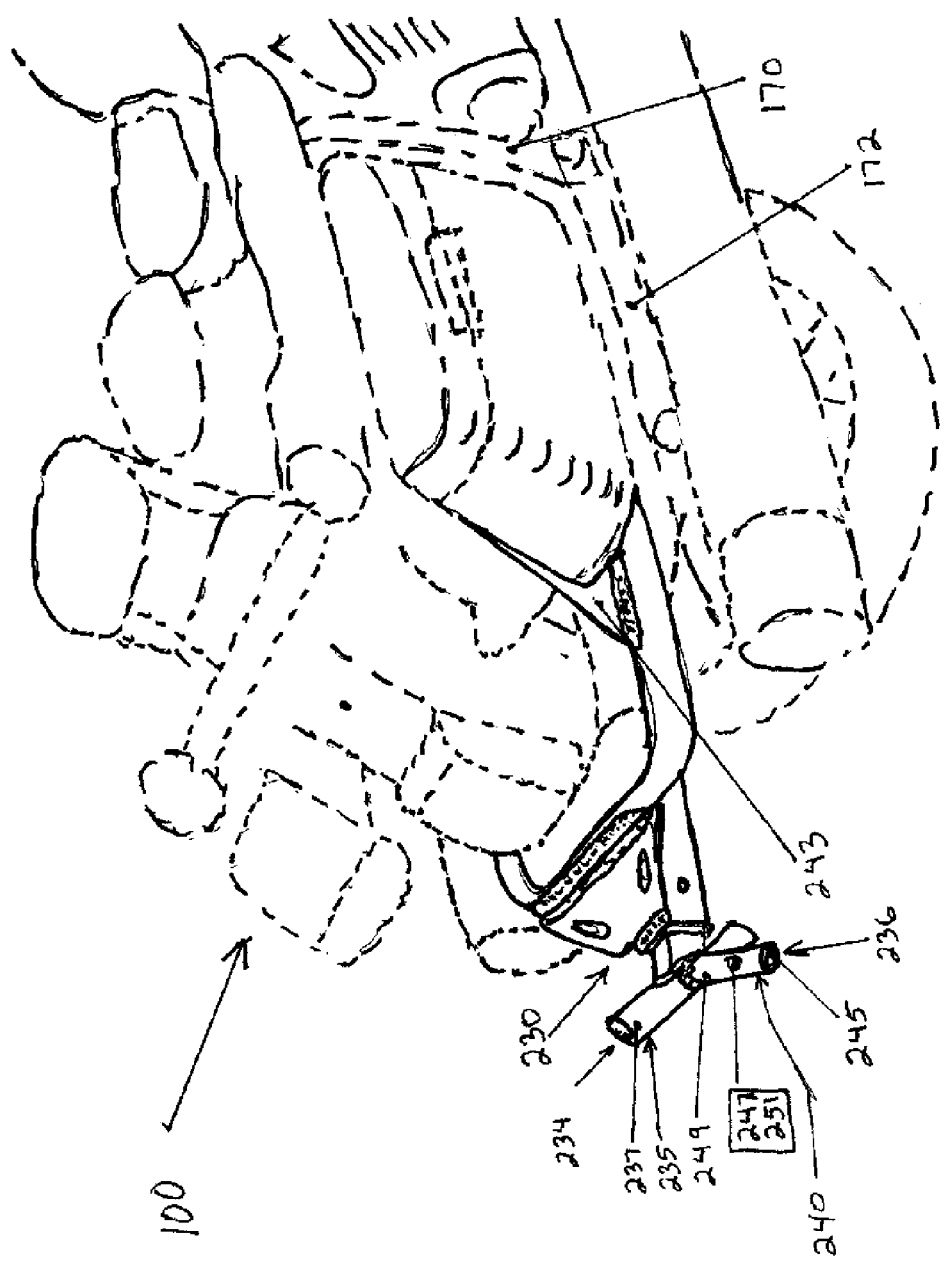
FIG. 8 is a side perspective view of a rear mounting structure attached to a motorcycle according to an embodiment of the present disclosure.

Referring to FIGS. 6-8, the rear mounting structure 230 includes a motorcycle engaging structure 232, defines a flexible structure support member receiving aperture 234, and optionally defines a safety support member receiving aperture 236. The motorcycle engaging structure 232, flexible structure support member receiving aperture 234, and optional safety support member receiving aperture 238 may be integral or attached. The rear mounting structure 230 is composed of a material selected from the group consisting of metals, composites, and combinations thereof.

In one embodiment, the motorcycle engaging structure 232 may be unusually shaped. However, the motorcycle engaging structure 232 may be shaped in any way to accommodate the motorcycle 100 to which it will be attached. More particularly, the shape of the motorcycle engaging structure 232 may change as a function of the make and model of the motorcycle 100 to which it will be attached. For example, in FIG. 6, the rear mounting structure 230 is customized for attachment to a Harley Davidson Dyna®. As another example, in FIG. 7, the rear mounting structure 230 is customized for attachment to an FLH Harley Davidson® Touring Bike. However, it is understood by one of ordinary skill in the art that the shape of the motorcycle engaging structure 232 may be adapted to accommodate the rear portion 130 of the motorcycle 100 to which it will be attached.

The motorcycle engaging structure 232 may include motorcycle engaging wings or motorcycle engaging plates 242, 243. The motorcycle engaging wings or plates 242, 243 may be positioned such that they are substantially parallel to one another. In one particular embodiment, the wings or plates 242, 243 may extend substantially normal to a body portion 244 of the motorcycle engaging structure 232. The wings or plates 242, 243 may be separated by a distance or gap $g_1$ (as indicated by double arrow $g_1$), such that when attached to the rear portion 130 of the motorcycle 100, a portion of the motorcycle 100 may extend through the gap between the wings or plates 242, 243. The separation distance or gap $g_1$ is dependent upon the width of the motorcycle 100; more specifically, the separation distance or gap $g_1$ may be any distance to accommodate the width the motorcycle 100 such that wings or plate 242, 243 can be attached thereto (e.g. so as to fit the individual make and model of the motorcycle 100).

In one embodiment, the motorcycle engaging wings or plates 242, 243 may function as brackets. In a further embodiment, the motorcycle engaging wings or plates 242, 243 may define a plurality of apertures 246 for receiving attachment devices (discussed below) for securing the motorcycle engaging structure 232 to the motorcycle 100. The motorcycle engaging structure 232 is attachable to the rear portion 130 of the motorcycle 100. More particularly, the motorcycle engaging structure 232 is attachable to a solid mounting surface including but not limited to the frame 170 of the motorcycle 100. In one particular embodiment, the motorcycle engaging structure 232 may be attached to a swing arm 172 which is either attached to or integral with the frame 170. In another embodiment, as shown in FIG. 6, the motorcycle engaging plates 242, 243 may function as brackets which may be attached to a solid mounting surface as previously discussed via a rear attachment bracket 270.

The rear mounting structure 230 also defines a flexible structure support member receiving aperture 234. The flexible structure support member receiving aperture 234 is defined by a tubular member 235 as previously discussed with regard to tubular member 215. The tubular member 235 has an outer surface 237 and an inner surface 239. The tubular member 235 extends outwardly from the body portion 244 of the motorcycle engaging structure 232. As previously discussed, a flexible structure support member 30 may be releasably attached to the rear mounting structure 230 through the flexible structure support member receiving aperture 234. In one embodiment, the flexible structure support members 30 may be releasably attached to the motorcycle 100 via a sliding fit. In an alternative embodiment wherein the flexible structure support members 30 are releasably attached to the motorcycle 100 with a pin 422, the tubular member 235 may include an aperture 259 through which the pin 422 may be inserted. In this way, the flexible structure support members 30 may be inserted within the flexible structure support member receiving aperture 234 and the pin 422 may be inserted through the apertures 45, 259, securing the flexible structure support member to the rear mounting structure 230.

In another alternative embodiment wherein the flexible structure support members 30 include a spring bias catch 47, the tubular member 235 may define a catch 241 through which an engaging member 47a of a flexible structure support member 30 may extend, securing the attachment of the flexible structure support member 30 to the rear mounting structure 230. This may be accomplished via the steps previously discussed with regard to attaching a plurality of attachment members 30c, 30d. In yet another alternative embodiment wherein the flexible structure support member 30 includes threads 49, the inner surface 239 of the tubular member 235 may include threads (not shown) as previously discussed with regard to the tubular member 215, such that the flexible structure support member 30 may be releasably attached to the front mounting structure 210 by threading the attachment portion 48 into the aperture 234.

The rear mounting structure 230 may also define a safety support member receiving aperture 236. The safety support member receiving aperture 236 is defined by a tubular member 240 as previously discussed with regard to tubular member 220. The tubular member 240 has an outer surface 249 and an inner surface 245. The tubular member 240 extends outwardly from the motorcycle engaging structure 232. A safety support member 50 (discussed below) may be releasably attached to the rear mounting structure 230 through the safety support member receiving aperture 236. In one embodiment wherein the safety support members 50 are releasably attached to the motorcycle 100 with a pin 422, the tubular member 240 may include an aperture 251 through which the pin 422 may be inserted. In this way, the safety support members 50 may be inserted within the safety support member receiving aperture 236 and the pin 422 may be inserted through the apertures 57, 251, securing the safety support member 50 to the rear mounting structure 230.

In an alternative embodiment, the safety support member 50 may include a spring bias catch 65, and the tubular member 240 may define a catch 247 through which an engaging member 65a of a safety support member 50 may extend, securing the attachment of the flexible safety support member 50 to the rear mounting structure 230. This may be accomplished via the steps previously discussed with regard to attaching a plurality of attachment members 30c, 30d. In another alternative embodiment, the safety support member 50 includes threads (not shown), the inner surface 245 of the tubular member 240 may include threads (not shown) as previously discussed with regard to the tubular member 220, such that the flexible structure support member 30 may be releasably attached to the rear mounting structure 230 by threading the attachment portion 63 into the aperture 234. This may be accomplished via the steps previously discussed with regard to attaching a plurality of attachment members 30c, 30d. The tubular members 235, 240 may extend from the motorcycle 100 at any angle such that when the hammock 10 is completely assembled, the flexible structure 70 is suspended substantially in between the flexible structure support members 30 and the safety support members 50 contact the support surface 300.

In one particular embodiment, referring to FIG. 7, the tubular member 235 may be attachable to the body 244 of the motorcycle engaging structure 232 (as opposed to being integral therewith). In this particular embodiment, the tubular member 235 may be provided as a part of a bent member 248, wherein the bent member 248 includes a rear mounting structure engaging member 250. In bent member 248 may have a substantially elongate shape. In another embodiment, the bent member 248 may have a cross-sectional shape selected from the group consisting of circular, oblong, elliptical, triangular, square, and rectangular. In a further embodiment, the bent member 248 may have a substantially elongate shape with a substantially rectangular cross-section. The bent member 248 may be hollow, solid, or substantially solid, and combinations thereof.

Similarly, in this embodiment, the body portion 244 of the rear mounting structure 230 may also include a bent member receiving aperture 252. The bent member receiving aperture 252 may also have a substantially elongate shape. In another embodiment, the bent member receiving aperture 252 may have a cross-sectional shape selected from the group consisting of circular, oblong, elliptical, triangular, square, and rectangular. In a further embodiment, the bent member receiving aperture 252 may have a substantially elongate shape with a substantially rectangular cross-section. In this embodiment, the length $L_5$ and width $W_1$ (indicated by double arrows $L_5$ and $W_1$) may be greater than the width of the bent member 248, such that the bent member 248 may be inserted therein. The bent member 248 may be releasably attached to the rear mounting structure 230 with any suitable attachment means as previously discussed. For example, in one embodiment, the bent member 248 may include a spring bias catch 254 and the body portion 244 which defines the bent member receiving aperture 252 may include a catch 256, such that the bent member 248 may be secured thereto as previously discussed. Alternatively, as another example, the bent member 248 may be secured to the bent member receiving aperture 252 with a pin 422 (as shown in FIG. 13A). Also in this embodiment, the wings 242, 243 may be attachable to the body 244 of the motorcycle engaging structure 232 (as opposed to being integral therewith). In this particular embodiment, the wings 242, 243 may include tabs which may be inserted within corresponding apertures defined by the body 244, such that the wings 242, 243 may be releasably attached to the body 244 of the motorcycle engaging structure 232.

Figure 9:
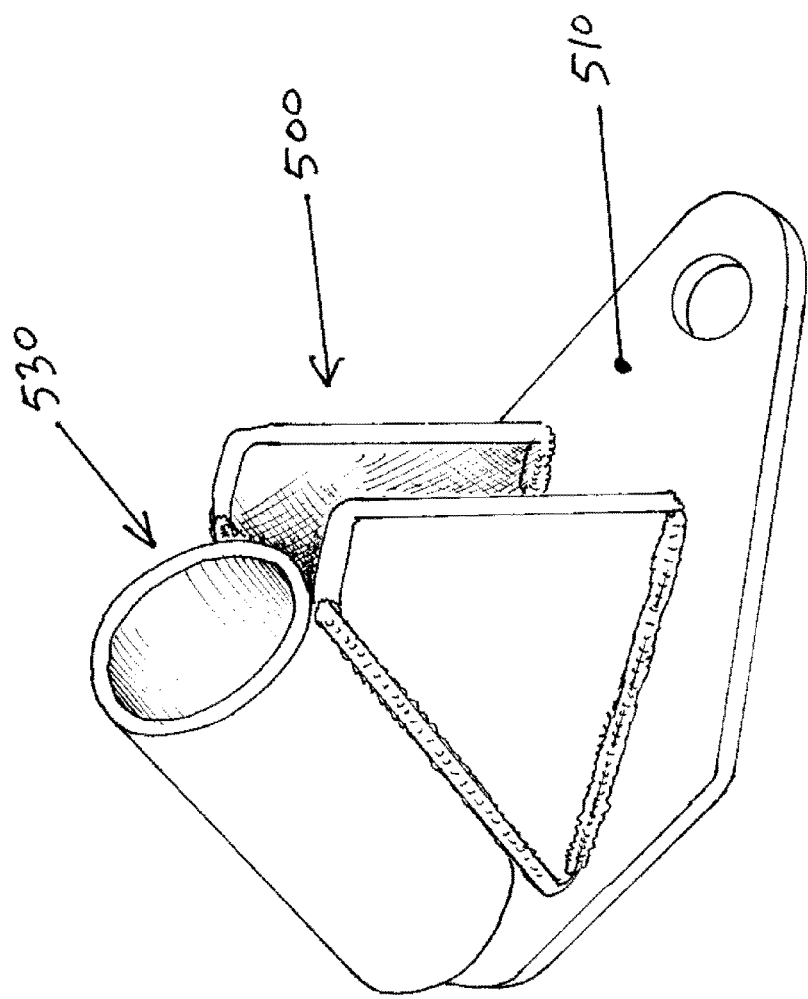
FIG. 9 is a side perspective view of a safety support mounting structure according to an embodiment of the present disclosure.
Figure 10:
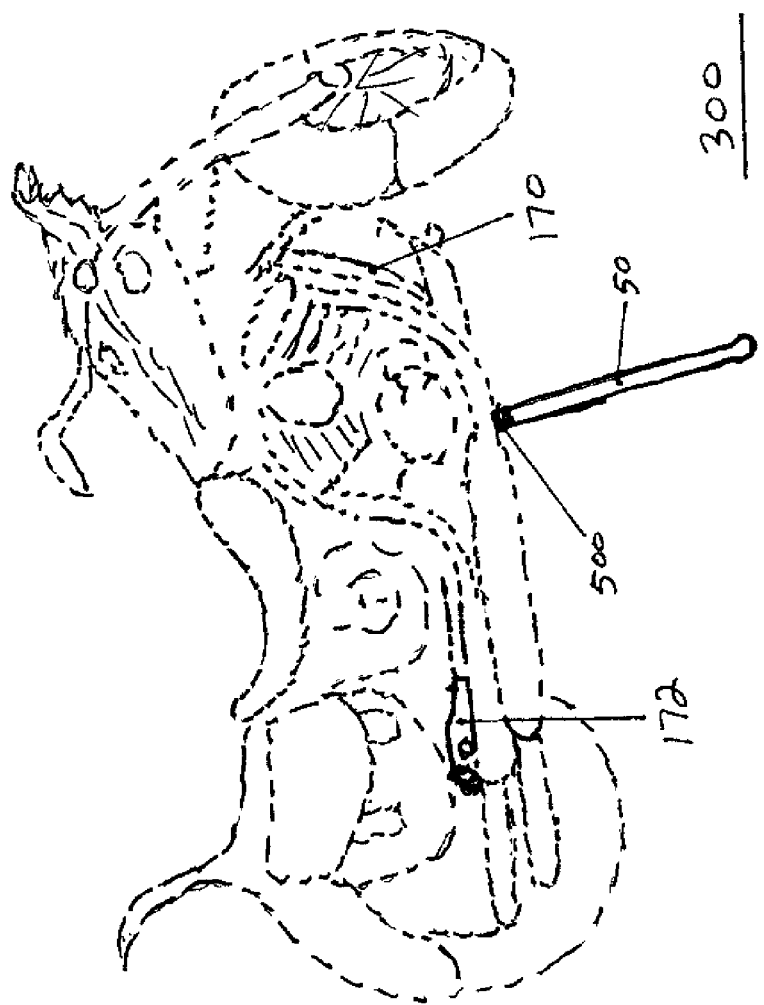
FIG. 10 is a side perspective view of a safety support mounting structure attached to a motorcycle according to an embodiment of the present disclosure.

Referring to FIGS. 9 and 10, in an alternative embodiment, each of the safety support members 50 may be releasably attached to the front portion 110 or the rear portion 130 of the motorcycle 100 with a safety support mounting structure 500. The safety support mounting structures 500 may be attached to and/or integral with the front and rear portions 110, 130 of the motorcycle 100. More particularly, the safety support mounting structures 500 may be integral with a solid surface including but not limited to the frame 170 and/or swing arm 172 of the motorcycle 100 as previously discussed. For example, the safety support mounting structures 500 may be welded to the frame 170 and/or swing arm 172 of the motorcycle 100.

In one particular embodiment, the safety support members 50 may be releasably attached to the front portion 110 or the rear portion 130 of the motorcycle 100 with the safety support mounting structures 500 in between the front mounting structure 210 and the rear mounting structure 230. In this particular embodiment, the safety support members 50 may be releasably attached to the motorcycle 100 with the safety support mounting structures 500 independent of the front mounting structure 210 and the rear mounting structure 230. The safety support mounting structure 500 includes a motorcycle engaging plate 510 and defines a safety support member receiving aperture 530. The motorcycle engaging plate 510 and safety support member receiving aperture 530 may be integral or attached. The safety support mounting structure 500 is composed of a material selected from the group consisting of metals, composites, and combinations thereof. The motorcycle engaging plate 510 may be shaped to accommodate the motorcycle 100 to which it will be attached. More particularly, the shape of the motorcycle engaging plate 510 may change as a function of the make and model of the motorcycle 100 to which it will be attached.

The front, rear, and safety support mounting structures 210, 230, 500 are releasably attachable to the front and rear portions 110, 130 of the motorcycle 100. The front, rear, and safety support mounting structures 210, 230, 500 are not generally detached from the motorcycle 100 during the assembly and/or disassembly of the hammock 10. Rather, upon attaching the front, rear, and/or safety support mounting structures 210, 230, 500 to the motorcycle 100, the structures 210, 230, 500 remain fixed to the motorcycle 100. In this way, the mounting structures 210, 230, 500 provide quick, releasable attachment points to which the hammock 10 may be attached and supported. Further, the front and rear mounting structure 210, 230, 500 are attached to the front and rear portions 110, 130 of the motorcycle 100 such that the hammock 10 may be attached and supported on a side of the motorcycle 100 which is opposite to that from which the kickstand extends. In this way, the hammock 10 may act as a counterbalance to the weight of the motorcycle 100 which rests upon the kickstand.

In alternative embodiment, the front, rear, and safety support mounting structures 210, 230, 500 may be integral with the front and rear portions 110, 130 of the motorcycle 100. More particularly, the front, rear, and safety support mounting structures 210, 230, 500 may be integral with the frame 170 and/or swing arm 172 of the motorcycle 100 as previously discussed. For example, the front, rear, and safety support mounting structures 210, 230, 500 may be welded to the frame 170 and/or swing arm 172 of the motorcycle 100.

Figure 11:
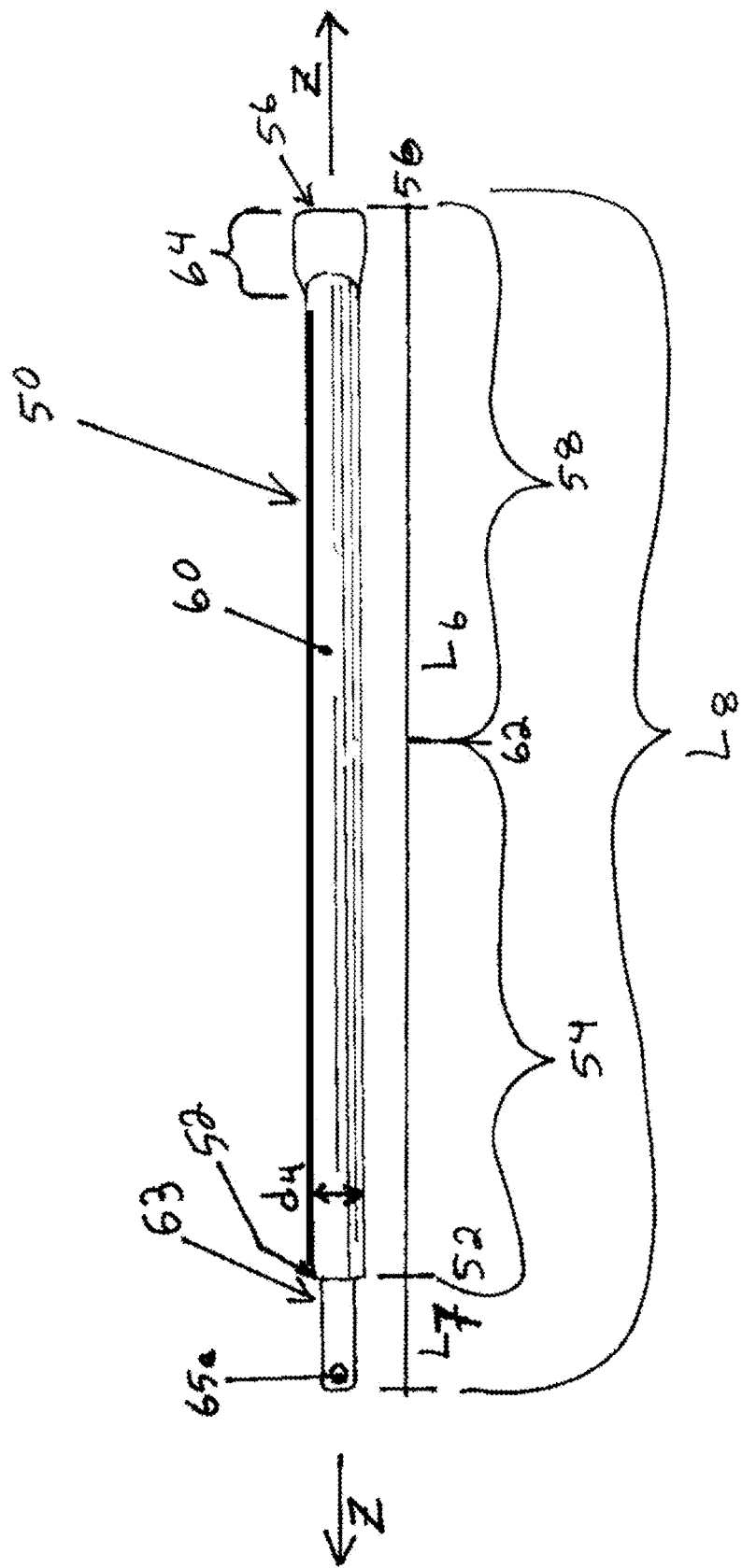
FIG. 11 is a front perspective view of a safety support member according to an embodiment of the present disclosure.

Referring to FIG. 11, as previously discussed, the hammock 10 also includes at least one safety support member 50. In one particular embodiment, the safety support member 50 has a substantially elongate shape. In another embodiment, the safety support member 50 may have a cross-sectional shape selected from the group consisting of circular, oblong, elliptical, triangular, square, and rectangular. In a further embodiment, the safety support member 50 has a substantially elongate shape with a substantially circular cross-section. In yet a further embodiment, the safety support member 50 has a substantially rod-like shape with a substantially circular cross-section. The safety support member 50 may be hollow, solid, or substantially solid, and combinations thereof. In one embodiment, the safety support member 50 is composed of a material selected from the group consisting of metals, composites, and combinations thereof.

The safety support member 50 has an upper surface 52, an upper portion 54, a lower surface 56, a lower portion 58, and middle surfaces 60. The upper portion 54 extends from the upper surface 52 to the approximate midpoint 62 of the length $L_6$ of the safety support member 50 (wherein the length $L_6$ extends from the upper surface 52 to the lower surface 56). The lower portion 58 extends from the lower surface 56 to the midpoint 62. The middle surfaces 60 extend from the upper surface 52 to the lower surface 56.

The safety support members 50 are attachable to one of the front portion 110 or the rear portion 130 of the motorcycle 100. The upper portion 54 of the safety support member 50 may include an attachment portion 63 integral with or attached to the upper portion 54. In one embodiment, the attachment portion 63 has a substantially elongate shape. In another embodiment, the attachment portion 63 may have a cross-sectional shape selected from the group consisting of substantially circular, oblong, elliptical, triangular, square, and rectangular. In a further embodiment, the attachment portion 63 may have a substantially elongate shape with a substantially circular cross-section. In a further embodiment, the attachment portion 63 has a substantially rod-like shape with a substantially circular cross-section. The attachment portion 63 may extend outwardly from the upper surface 52 in a direction substantially parallel to the center axis Z of the safety support members 50 (as indicated by double arrow Z). The attachment portion 63 of each of the safety support members 50 may be releasably attached to the front portion 110 or the rear portion 130 of the motorcycle 100 (as discussed in an earlier section).

The overall length $L_8$ (made up of sublengths $L_6$ and $L_7$) of the safety support members 50 may be from about 0.5 to about 6 feet, or alternatively from about 1 to about 3 feet, or alternatively about 2 feet. The diameter $d_4$ of the safety support members 50 may be from about 0.5 to about 4 inches, or alternatively from about 1 to about 3 inches, or alternatively about 1.5 inches. The dimensions of the safety support members 50 should not be limited to those disclosed herein, however, but may include any dimensions such that the safety support members 50 are attachable to the front portion 110 and the rear portion 130 of the motorcycle 100.

The lower portion 58 of each of the safety support members 50 may include a foot portion 64 for contacting a support surface. The foot portion 64 may be integral with or attached to the lower portion 58 of the safety support member 50. The foot portion 64 comprises a substantially flat surface for contacting a support surface. In this embodiment, the foot portion 64 may extend from the lower portion 58 in a direction substantially parallel to the central axis Z. Alternatively, the foot portion 64 may extend from the lower portion 58 at an angle θ from the central axis Z. In one particular embodiment, the angle θ may be greater than about 90° and less than about 180°. Alternatively, the angle θ may be from about 90° to about 135°.

In a further embodiment, the foot portion 64 may extend from the lower portion 58 at any angle θ such that the foot portion 64 is substantially parallel to a support surface 300 when releasably attached to the front portion 110 or the rear portion 130 of the motorcycle 100. In this way, the safety support member 50 provides structural support to the hammock 10 such that when completely assembled, the flexible structure 70 may support the weight of a person while suspended substantially in between the flexible structure support members 30.

In one embodiment, the hammock 10 includes one safety support member 50. In this particular embodiment, the safety support member 50 may be releasably attached to the front portion 110 of the motorcycle 100. In a further embodiment, the safety support member 50 may be releasably attached to the front portion of the motorcycle 100 with the front mounting structure 210. Referring specifically to FIG. 12, in another embodiment, the hammock 10 includes two safety support members 50. In this particular embodiment, the safety support members 50 may be releasably attached to the front portion 110 and the rear portion 130 of the motorcycle 100. In a further embodiment, one of the safety support members 50 may be releasably attached to the front portion 110 of the motorcycle 100 with the front mounting structure 210. The remaining safety support member 50 may be releasably attached to the rear portion 130 of the motorcycle 100 with the rear mounting structure 230. However, as previously discussed, in an alternative embodiment, at least one of the safety support members 50 may be releasably attached to the front portion 110 or the rear portion 130 of the motorcycle with safety support mounting structures 500.

The safety support members 50 may be releasably attached to the front portion 110 or the rear portion 130 of the motorcycle 100. More particularly, the safety support members 50 may be releasably attached the front portion 110 or the rear portion 130 of the motorcycle 100 via a sliding fit, a clip, a pin 422 (as shown in FIG. 13A), a spring bias catch 65, or threads (not shown). In particular, the attachment portion 63 of each of the safety support members 50 may be releasably attached to the front mounting structure 210, the rear mounting structure 230, or the safety support mounting structure 500 as discussed in an earlier section.

In one embodiment wherein each of the safety support members 50 are releasably attached to one of the front mounting structure 210, the rear mounting structure 230, and the safety support mounting structures 500 via a sliding fit (as previously discussed), the safety support member receiving apertures 216, 236 may have a diameter which is greater that the diameter of the attachment portion 63, such that the attachment portion 63 may be inserted within the apertures 216, 236. The safety support members 50 may be releasably attached with a minimal amount of force.

In an alternative embodiment, the safety support members 50 may be releasably attached to one of the front mounting structure 210, the rear mounting structure 230, and the safety support mounting structures 500 via a pin 422 (as shown in FIG. 13A). In this particular embodiment, the safety support members 50 and the mounting structures 210, 230, 500 to which the safety support members 50 are attached may include apertures through which a pin 422 may extend.

In another alternative embodiment, the attachment portion 63 may include a spring bias catch 65. As previously discussed, the spring bias catch 65 includes a spring (not shown) operably attached to an engaging member 65a. Thus, the spring bias catch 65 may secure the attachment of safety support members 50 to the front mounting structure 210 and the rear mounting structure 230 wherein the tubular members 220, 240 define a catch through which the engaging member 65a may extend. However, it is understood by one skilled in the art that the attachment of the safety support members 50 to the motorcycle 100 should not be limited to a spring bias catch 65, but may include any suitable locking mechanism which secures the attachment of the members 50. In yet another alternative embodiment, the attachment portion 63 may include threads (not shown).

In an alternative embodiment, the safety support members 50 may be fixedly attached to the front portion 110 of the motorcycle 100 and the rear portion of 130 of the motorcycle 100. More particularly, in this embodiment, the safety support members 50 may be fixedly attached to the front and rear portions 110, 130 of the motorcycle 100 such that they are not removed during travel and/or extended rides. In this particular embodiment, the safety support members 50 may be transported by employing folding mechanisms such that each of the safety support members 50 may be compactly stored during travel and/or extended rides. One example of such a folding mechanism includes a hinging mechanism (such as is employed with a kickstand). In this way, the safety support members 50 may pivot upon the application of force such that the safety support members 50 do not contact the support surface 300.

Referring to FIGS. 1 and 12, as previously discussed, the hammock 10 includes a flexible structure 70 for supporting a person. The flexible structure 70 may be composed of cloth, canvas, woven networks of twine or rope, and combinations thereof. Moreover, as shown in FIG. 1, the flexible structure 70 may include a roof structure 80 which may serve to shelter a person from the outside elements.

The flexible structure 70 has a flexible shape. When releasably attached to the flexible structure support members 30, the flexible structure 70 has a U-shape. The flexible structure 70 has opposing ends 72, 74. The opposing ends 72, 74 are attachable to the pair of flexible structure support members 30. More particularly, the opposing end 72 may be releasably attached to one of the pair of the flexible structure support members 30 and the remaining opposing end 74 may be releasably attached to the remaining flexible structure support member 30. When releasably attached thereto, the flexible structure 70 is suspended above the support surface 300 and extends substantially between the flexible structure support members 30. The flexible structure 70 may support the weight of a person such that the person may comfortably rest and relax.

As previously discussed, the flexible structure 70 may include attachment devices 76, 78 for releasably attaching the flexible structure 70 to the flexible structure support members 30. In one embodiment, the attachment devices 76, 78 may include hooks, buckles, and/or loops. The hooks, buckles, and/or loops may be attached to the apertures 44, rings, or hooks as previously discussed.

In one particular embodiment, the attachment devices 76, 78 may include S-shaped hooks. The S-shaped hooks include two integral and oppositely positioned C-shaped curves and also include an inside surface and an outside surface. One of the C-shaped curves may engage the flexible structure 70, and the remaining C-shaped curve may engage the flexible structure support member 30. More particularly, one C-shaped curve may engage the upper portion 34 of the flexible structure support member 30 by hooking the curve over the edge of the upper portion 34 such that the inner surface of the S-hook may engage the upper portion 34 of the flexible structure support members 30. Alternatively, the attachment devices 76, 78 may include a looped structure. In one embodiment, the looped structure includes a rope. In this embodiment, the looped structure may be attached to a hook on the flexible structure support members 30 as discussed above. The attachment devices should not be limited to those disclosed herein, however, but may include any attachment devices wherein the flexible structure 70 may be releasably attached to the flexible structure support members 30 such that the flexible structure 70 is suspended substantially in between the flexible structure support members 30. The hammock 10 is also portable such that motorcycle riders may transport a hammock 10 with them during rides, providing quick access to the hammock 10 when breaks from riding are desired.

In yet another embodiment, a method of supporting a person on a hammock 10 releasably attached to a motorcycle 100 is disclosed. The method of supporting the person includes utilizing the hammock 10, as previously discussed in an earlier section.

Kit for Assembling a Hammock on a Motorcycle

Figure 13B:
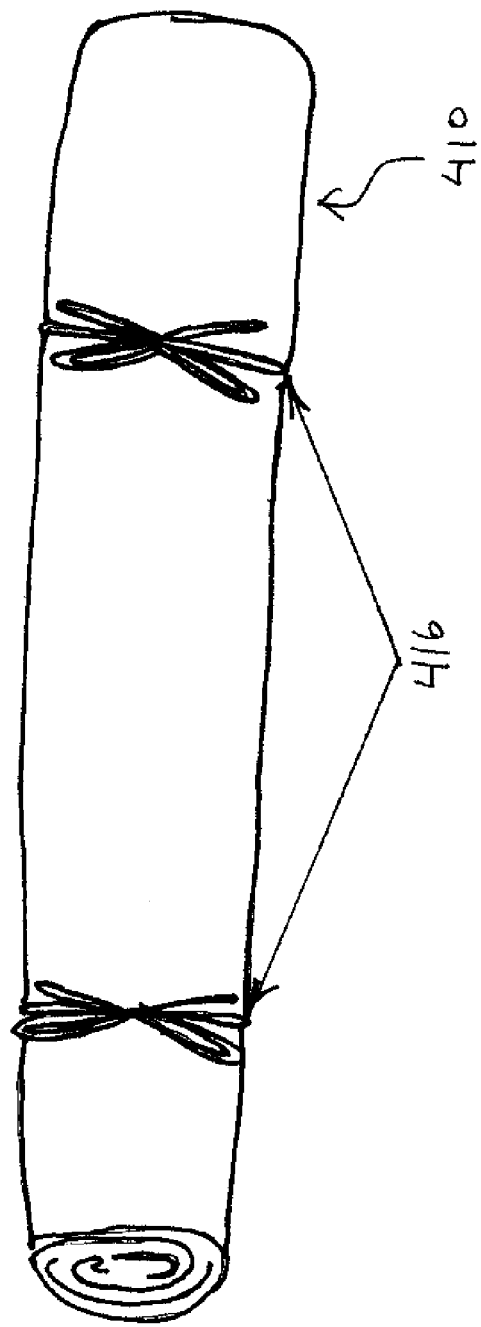
FIG. 13B is a front perspective view of a kit for assembling a hammock on a motorcycle in the traveling configuration according to an embodiment of the present disclosure.

Referring to FIGS. 13A and 13B, a kit 400 for assembling a hammock 10 on a motorcycle 100 is also disclosed. The kit 400 includes a front mounting structure 210 attachable to the front portion 110 of the motorcycle 100, a rear mounting structure 230 attachable to the rear portion 130 of the motorcycle 100, a pair of flexible structure support members 30, wherein each of the flexible structure support members 30 is attachable to one of the front mounting structure 210 and the rear mounting structure 230, at least one safety support member 50 attachable to one of the front portion 110 and the rear portion 130 of the motorcycle 100, and a flexible structure 70 for supporting a person, the flexible structure 70 comprising opposing ends 72, 74, wherein the opposing ends 72, 74 are attachable to each of the pair of flexible structure support members 30. The members and/or structures are as discussed in an earlier section.

The kit 400 may include a case 410 for accommodating the structures and/or members discussed above. In one embodiment, the case 410 may include a housing 412 for accommodating the members and/or structures. In one particular embodiment, the case 410 is capable of being rolled between a traveling and a operative configuration. As shown in FIG. 13B, when in the traveling configuration, the case 410 may comprise a compact, substantially cylindrical shape. As shown in FIG. 13A, when in the operative configuration, the case 410 may be substantially planar and may have a substantially rectangular shape. In the operative configuration, the members and/or structures are accessible within the housing 412. In one embodiment, the housing 412 may include a plurality of pockets 414 for accommodating the members and/or structures. In the traveling configuration, the members and/or structures are not accessible within the housing 412. Rather, in this configuration, the kit 400 may be stored in the saddle bags 150 of the motorcycle.

The case 410 may further include a fastening mechanism 416. In one embodiment, the fastening mechanism 416 may include a tying mechanism to releasably secure the case 410 in the traveling configuration. The kit 400 may also further include a plurality of attachment devices 420. More particularly, the kit 400 may include a plurality of attachment devices 420 for attaching the front mounting structure 210 to the front portion 110 of the motorcycle 100, the rear mounting structure 230 to the rear portion 130 of the motorcycle 100, and optionally, the safety support mounting structure to the front and/or rear portions 110, 130 of the motorcycle 100. The attachment devices 420 may include screws, nuts, bolts, washers, and combinations thereof. The attachment devices 420 may also include a pin 422 for use with the flexible structure support members 30 and the safety support members 50 as previously discussed. The attachment devices 420 should not be limited to those disclosed herein, however, but may include any attachments devices 420 capable of securing the front mounting structure 210 to the front portion 110 of the motorcycle 100 and the rear mounting structure 230 to the rear portion 130 of the motorcycle 100.

For the purposes of describing and defining the present disclosure it is noted that the terms "about" and "substantially" are utilized herein to represent the inherent degree of uncertainty that may be attributed to any quantitative comparison, value, measurement, or other representation. The terms "about" and "substantially" are also utilized herein to represent the degree by which a quantitative representation may vary from a stated reference without resulting in a change in the basic function of the subject matter at issue.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The above description and drawings are only to be considered illustrative of exemplary embodiments, which achieve the features and advantages of the present disclosure. Modification and substitutions the features and steps described can be made without departing from the intent and scope of the present disclosure. Accordingly, the disclosure is not to be considered as being limited by the foregoing description and drawings, but is only limited by the scope of the appended claims.

What is claimed is:

1. A hammock releasably attachable to a motorcycle, the hammock comprising:
 a pair of flexible structure support members, wherein one of the pair of flexible structure support members is releasably attachable to a front portion of the motorcycle with a front mounting structure, wherein the front mounting structure is integral with the front portion of the motorcycle, wherein the remaining flexible structure support member is releasably attachable to a rear portion of the motorcycle with a rear mounting structure, wherein the rear mounting structure is integral with the rear portion of the motorcycle, and wherein each of the flexible structure support members extends substantially upward and outward from the front mounting structure and the rear mounting structure when attached thereto;

at least one safety support member releasably attachable to one of the front portion and the rear portion of the motorcycle; and a flexible structure for supporting a person, the flexible structure comprising opposing ends, wherein the opposing ends are releasably attachable to each of the pair of flexible structure support members, such that:

when the hammock is releasably attached to the motorcycle, each of the pair of flexible structure support members is releasably attached to one of the front portion and the rear portion of the motorcycle, the at least one safety support member is releasably attached to one of the front portion and the rear portion of the motorcycle, and the opposing ends are releasably attached to each of the pair of flexible structure support members such that the flexible structure is suspended substantially in between the pair of flexible structure support members.

2. The hammock of claim 1 wherein each of the front mounting structure and the rear mounting structure comprise a flexible structure support member receiving aperture.

3. The hammock of claim 2, wherein at least one of the front mounting structure and the rear mounting structure comprise a safety support member receiving aperture.

4. The hammock of claim 1, wherein each of the pair of flexible structure support members comprise a plurality of support rods.

5. The hammock of claim 1, wherein each of the at least one safety support member contacts a support surface.

6. The hammock of claim 5, wherein each of the at least one safety support member comprises a foot portion for contacting a support surface.

7. The hammock of claim 1 comprising a pair of safety support members attachable to one of the front portion and the rear portion of the motorcycle.

8. The hammock of claim 7, wherein one of the pair of safety support members is attachable to the front portion of the motorcycle, and wherein the remaining safety support member is attachable to the rear portion of the motorcycle.

9. A method of supporting a person on a hammock releasably attached to a motorcycle comprising utilizing the device of claim 1.

10. A hammock releasably attachable to a motorcycle, the hammock comprising:

a pair of flexible structure support members, wherein one of the pair of flexible structure support members is attachable to a front portion of the motorcycle with a front mounting structure, and wherein the remaining flexible structure support member is attachable to a rear portion of the motorcycle with a rear mounting structure such that when attached thereto each of the pair of flexible structure support members extends substantially upward and outward from the front mounting structure and the rear mounting structure;

at least one safety support member, wherein each of the at least one safety support member is attachable to one of the front portion and the rear portion of the motorcycle with one of the front mounting structure, the rear mounting structure, and a safety support mounting structure such that when attached thereto, each of the at least one safety support member contacts a support surface;

a flexible structure for supporting a person, the flexible structure comprising opposing ends wherein the opposing ends are attachable to each of the pair of flexible structure support members, such that when the opposing ends are releasably attached to each of the pair of flexible structure support members, the flexible structure is suspended substantially in between the pair of flexible structure support members such that the person is supported without contacting the support surface.

11. A kit for assembling a hammock on a motorcycle, the kit comprising:

a front mounting structure, wherein the front mounting structure is attachable to a front portion of the motorcycle;

a rear mounting structure, wherein the rear mounting structure is attachable to a rear portion of the motorcycle;

a pair of flexible structure support members, wherein each of the flexible structure support members is attachable to one of the front mounting structure and the rear mounting structure, wherein one of the pair of flexible structure support members is attachable to the front mounting structure, and wherein the remaining flexible structure support member is attachable to the rear mounting structure such that when attached thereto, each of the flexible structure support members extends substantially upward and outward from the front mounting structure and the rear mounting structure;

at least one safety support member attachable to one of the front portion and the rear portion of the motorcycle; and a flexible structure for supporting a person, the flexible structure comprising opposing ends, wherein the opposing ends are attachable to each of the pair of flexible structure support members, such that:

when the hammock is assembled on the motorcycle, the front mounting structure is attached to the front portion of the motorcycle, the rear mounting structure is attached to the rear portion of the motorcycle, each of the pair of flexible structure support members is releasably attached to one of the front mounting structure and the rear mounting structure, the at least one safety support member is releasably attached to one of the front mounting structure and the rear mounting structure of the motorcycle, and the opposing ends are releasably attached to each of the pair of flexible structure support members such that the flexible structure is suspended substantially in between the pair of flexible structure support members.

12. The kit of claim 11, wherein each of the front mounting structure and the rear mounting structure comprise a flexible structure support member receiving aperture.

13. The kit of claim 11, wherein at least one of the front mounting structure and the rear mounting structure comprise a safety support member receiving aperture.

14. The kit of claim 11, wherein each of the pair of flexible structure support members comprise a plurality of support rods.

15. The kit of claim 11, wherein each of the at least one safety support member comprises a foot portion for contacting a support surface such that when the at least one safety support member is releasably attached to one of the front mounting structure and the rear mounting structure of the motorcycle, the foot portion of each of the at least one safety support member contacts a support surface.

16. The kit of claim 11, further comprising a plurality of attachment devices for attaching the front mounting structure to the front portion of the motorcycle and the rear mounting structure to the rear portion of the motorcycle.

* * * * *